United States Patent
Zhang

(10) Patent No.: US 12,044,157 B2
(45) Date of Patent: Jul. 23, 2024

(54) METHOD AND DEVICE FOR DIAGNOSING A COATED PARTICULATE FILTER ARRANGED IN AN EXHAUST-GAS DUCT OF A MOTOR VEHICLE

(71) Applicant: Vitesco Technologies GmbH, Regensburg (DE)

(72) Inventor: Hong Zhang, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/907,792

(22) PCT Filed: Feb. 11, 2021

(86) PCT No.: PCT/EP2021/053374
§ 371 (c)(1),
(2) Date: Aug. 29, 2022

(87) PCT Pub. No.: WO2021/170420
PCT Pub. Date: Sep. 2, 2021

(65) Prior Publication Data
US 2023/0135221 A1    May 4, 2023

(30) Foreign Application Priority Data
Feb. 28, 2020 (DE) ............... 10 2020 202 551.7

(51) Int. Cl.
*F01N 9/00* (2006.01)
*F01N 3/02* (2006.01)
(Continued)

(52) U.S. Cl.
CPC ............ *F01N 9/002* (2013.01); *F01N 3/02* (2013.01); *F01N 3/035* (2013.01); *F01N 11/00* (2013.01);
(Continued)

(58) Field of Classification Search
CPC .......... F01N 9/002; F01N 3/035; F01N 11/00; F01N 2550/04; F01N 2560/026; F01N 2900/1606; F01N 2900/1616
See application file for complete search history.

(56) References Cited

U.S. PATENT DOCUMENTS 5,935,400 A * 8/1999 Takami ............. G01N 27/4067
204/406
9,151,206 B2 * 10/2015 Van Nieuwstadt ... F02D 41/029
(Continued)

FOREIGN PATENT DOCUMENTS

DE      100 56 015      5/2002 ............ B01D 53/00
DE   10 2008 031 646   1/2010 ............ F01N 11/00
(Continued)

OTHER PUBLICATIONS

Search Report for International Application No. PCT/EP2021/053374, 14 pages, Apr. 13, 2021.
(Continued)

*Primary Examiner* — Matthew T Largi
(74) *Attorney, Agent, or Firm* — Slayden Grubert Beard PLLC

(57) ABSTRACT

Various embodiments include a method for regenerating a coated particulate filter arranged in an exhaust-gas duct of a motor vehicle. The method may include: detecting a need for particulate filter regeneration; determining a first diagnosis value before initiating particulate filter regeneration; after determining the first diagnosis value, carrying out particulate filter regeneration; determining a second diagnosis value after particulate filter regeneration; determining a difference between the first determined diagnosis value and the second determined diagnosis value; comparing the determined dif-
(Continued)

ference with a threshold value; and identifying a particulate filter defect if the determined difference exceeds the threshold value.

9 Claims, 1 Drawing Sheet

(51) Int. Cl.
    *F01N 3/035*     (2006.01)
    *F01N 11/00*     (2006.01)
    *F02D 41/02*     (2006.01)

(52) U.S. Cl.
    CPC .... *F01N 2550/04* (2013.01); *F01N 2560/026* (2013.01); *F01N 2900/0416* (2013.01); *F01N 2900/1606* (2013.01); *F01N 2900/1616* (2013.01); *F02D 41/029* (2013.01)

(56) References Cited

U.S. PATENT DOCUMENTS

| | | | |
|---|---|---|---|
| 9,399,943 B1* | 7/2016 | Zhang | F01N 3/027 |
| 10,808,593 B2* | 10/2020 | Nienhoff | F01N 3/035 |
| 11,339,702 B2* | 5/2022 | Townson | F01N 3/208 |
| 2005/0263397 A1* | 12/2005 | Yasui | G05D 23/2401 |
| | | | 204/425 |
| 2006/0254265 A1* | 11/2006 | Odajima | F01N 11/002 |
| | | | 60/297 |
| 2008/0041035 A1 | 2/2008 | Sawada | 60/277 |
| 2010/0205943 A1* | 8/2010 | Gonze | F01N 3/0256 |
| | | | 60/303 |
| 2013/0126858 A1 | 5/2013 | Boerner et al. | 60/285 |
| 2014/0216017 A1* | 8/2014 | Shirai | F01N 3/0231 |
| | | | 60/297 |
| 2015/0086426 A1* | 3/2015 | DeGeorge | F01N 3/025 |
| | | | 422/119 |
| 2015/0275738 A1* | 10/2015 | Van Nieuwstadt | F01N 11/00 |
| | | | 73/114.76 |
| 2016/0222857 A1* | 8/2016 | Surnilla | F02D 41/029 |
| 2017/0074146 A1* | 3/2017 | Maletic | F01N 9/002 |
| 2019/0078480 A1 | 3/2019 | Lauritano | F01N 3/20 |
| 2019/0360378 A1 | 11/2019 | Lee | F01N 3/20 |
| 2020/0025054 A1* | 1/2020 | Barve | B01D 37/046 |
| 2020/0378288 A1 | 12/2020 | Zhang | F01N 3/208 |

FOREIGN PATENT DOCUMENTS

| | | | |
|---|---|---|---|
| DE | 10 2018 121 938 | 3/2019 | F01N 9/00 |
| DE | 10 2018 215 627 | 5/2019 | F01N 11/00 |
| DE | 10 2018 130 459 | 11/2019 | F01N 9/00 |
| DE | 10 2019 210 403 | 1/2020 | F01N 9/00 |
| EP | 2 542 331 | 7/2018 | B01D 53/94 |
| WO | 2016 188809 | 12/2016 | F01N 11/00 |

OTHER PUBLICATIONS

Search Report for German Application No. 10 2020 202 551.7, 10 pages, Oct. 26, 2020.

* cited by examiner

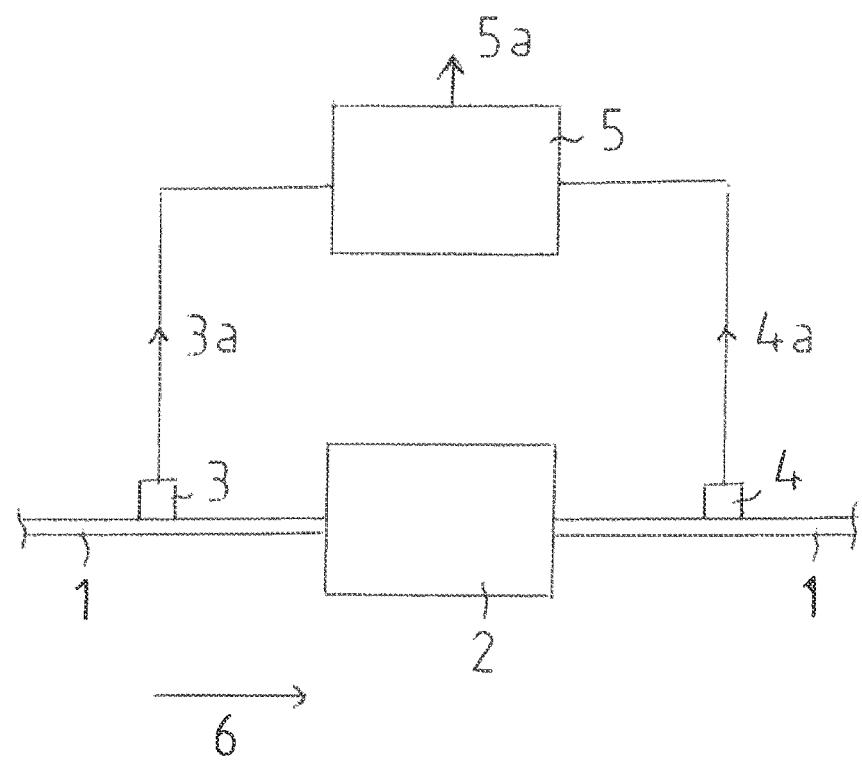

METHOD AND DEVICE FOR DIAGNOSING A COATED PARTICULATE FILTER ARRANGED IN AN EXHAUST-GAS DUCT OF A MOTOR VEHICLE

CROSS-REFERENCE TO RELATED APPLICATIONS

This application is a U.S. National Stage Application of International Application No. PCT/EP2021/053374 filed Feb. 11, 2021, which designates the United States of America, and claims priority to DE Application No. 10 2020 202 551.7 filed Feb. 28, 2020, the contents of which are hereby incorporated by reference in their entirety.

TECHNICAL FIELD

The present disclosure relates to motor vehicles. Various embodiments include methods and/or devices for diagnosing a coated particulate filter arranged in an exhaust-gas duct of a motor vehicle.

BACKGROUND

Some vehicles use a coated particulate filter in the exhaust-gas duct in order to reduce pollutants in the exhaust gas emitted to the surroundings of the motor vehicle. Such a coated particulate filter may be a coated diesel particulate filter, which is also known by the abbreviation SDPF. Such a diesel particulate filter combines the functionalities of an SCR catalytic converter and a diesel particulate filter. It reduces both the nitrogen oxide emissions NOx and the soot emissions of the vehicle.

According to legal requirements, particulate filter systems must be monitored so precisely that defects that cause specified limit values to be exceeded are detected in good time for suitable countermeasures to be taken. A fault detection in a particulate filter system requires a measurement of the filter loading with soot that is as accurate as possible.

DE 10 2008 031 646 B4 describes a method for detecting a defect in a particulate filter of a motor vehicle by measuring the particulate loading of the filter, in which calculation models are used to estimate the particulate matter emission of the internal combustion engine of the motor vehicle and calculate the progression of the filter loading, the filter loading is measured directly and the calculated loading and the measured loading are compared, wherein, when there is a fresh or regenerated filter, the calculated progression of the filter loading is compared with the measured progression of the filter loading in order to adapt the calculation models to the measured progression, and a defect in the particulate filter is detected from a difference in the progression between the calculated loading and the measured loading.

Some systems determine the efficiency of a coated diesel particulate filter using the output signals from PM sensors (fine dust sensors) or from nitrogen oxide sensors (NOx sensors). Some methods compare the determined loading of a particulate filter with a specified threshold value and to carry out particulate filter regeneration in the event that the determined loading of the particulate filter exceeds the specified threshold value. For such particulate filter regeneration, it is necessary to heat the particulate filter to a high temperature, which is in the range of 600° C., so that the pollutant particles that have accumulated in the particulate filter are burned.

SUMMARY

The teachings of the present disclosure may be used to improve the diagnosis of a coated particulate filter arranged in an exhaust-gas duct of a motor vehicle. For example, some embodiments include a method for diagnosing a coated particulate filter arranged in an exhaust-gas duct of a motor vehicle, comprising: recognizing the need for particulate filter regeneration, determining a first diagnosis value after recognizing the need for particulate filter regeneration and before initiating the particulate filter regeneration, after determining the first diagnosis value, carrying out the particulate filter regeneration, determining a second diagnosis value after particulate filter regeneration has been carried out, determining a difference between the two determined diagnosis values, comparing the determined difference with a threshold value and detecting a particulate filter defect if the determined difference exceeds the threshold value.

In some embodiments, the threshold value is a specified constant value.

In some embodiments, the particulate filter defect is a particulate filter defect that occurred during the particulate filter regeneration.

In some embodiments, the particulate filter defect is a crack in the particulate filter that occurred during the particulate filter regeneration.

In some embodiments, the determined difference is used for correcting a particulate filter regeneration strategy for subsequent particulate filter regeneration.

In some embodiments, the temperature for the subsequent particulate filter regeneration is lowered.

In some embodiments, a threshold value for the particulate filter loading at which particulate filter regeneration is considered necessary is lowered.

In some embodiments, the diagnosis values are determined using the output signals from sensors, one of which is arranged upstream of the particulate filter and the other of which is arranged downstream of the particulate filter.

In some embodiments, at least one of the sensors is a NOx sensor.

In some embodiments, the diagnosis values are gradient values.

In some embodiments, a gradient value is determined by evaluating an output signal of an NOx sensor arranged downstream of the particulate filter after the occurrence of a jump in an ammonia value measured upstream of the particulate filter.

In some embodiments, the method is controlled by a control unit.

In some embodiments, the control unit outputs control signals required for diagnosis on the basis of a stored work program and stored data and using sensor signals fed to it.

As another example, some embodiments include a device for diagnosing a coated particulate filter arranged in an exhaust-gas duct of a motor vehicle, which has a control unit (5) which is designed for controlling one or more of the methods as described herein.

BRIEF DESCRIPTION OF THE DRAWINGS

Further properties of the teachings herein are addressed in the following explanation of FIG. 1. The FIGURE shows an exemplary embodiment of a device for diagnosing a coated particulate filter arranged in an exhaust-gas duct of a motor vehicle.

DETAILED DESCRIPTION

The teachings of the present disclosure may include a method for diagnosing a coated particulate filter arranged in an exhaust-gas duct of a motor vehicle, the following steps are carried out: recognizing the need for particulate filter regeneration, determining a first diagnosis value after recognizing the need for particulate filter regeneration and before initiating the particulate filter regeneration, after determining the first diagnosis value, carrying out the particulate filter regeneration, determining a second diagnosis value after particulate filter regeneration has been carried out, determining a difference between the two determined diagnosis values, comparing the determined difference with a threshold value, and detecting a particulate filter defect if the determined difference exceeds the threshold value.

The teachings of the present disclosure allow a detected particulate filter defect to be assigned to a cause of the particulate filter defect. In particular, the methods allow the detected particulate filter defect to be assigned to particulate filter regeneration that has been carried out. For instance, if an excessive temperature occurs during particulate filter regeneration, it may happen that the material of the particulate filter partially melts and cracks occur in the material, as a result of which the filtering efficiency is reduced in subsequent operation of the particulate filter and for example falls below specified limit values for on-board diagnosis. A use of the methods described herein may involve such particulate filter defects being detected and assigned to the particulate filter regeneration process.

In some embodiments, the difference between the two diagnosis values that indicates the particulate filter defect can be used for correcting the particulate filter regeneration strategy for subsequent particulate filter regeneration. For example, the temperature for subsequent particulate filter regeneration may be lowered. In some embodiments, a threshold for the particulate filter loading at which particulate filter regeneration is considered necessary may be lowered.

FIG. 1 shows an example embodiment wherein a coated diesel particulate filter 2 is arranged in the exhaust-gas duct 1 of a motor vehicle. This coated diesel particulate filter is intended to filter out pollutant particles from the exhaust gas emitted by the engine of the motor vehicle, which flows through the coated diesel particulate filter 2 in the exhaust-gas flow direction 6, so that the exhaust gas emitted by the particulate filter 2 has a reduced pollutant content.

In the course of the operating life of the motor vehicle, filtered out pollutant particles, in particular soot particles, are deposited on the inner walls of the particulate filter, so that the particulate filter loading of the particulate filter becomes increasingly greater. To avoid clogging of the particulate filter caused by this increasing particulate filter load, particulate filter regeneration is required. For this particulate filter regeneration, the temperature of the exhaust gas flowing through the particulate filter is increased to about 600° C. At this high temperature, the pollutant particles deposited on the inner walls of the particulate filter burn, so that the walls of the particulate filter are freed from pollutant particles.

To recognize the need for particulate filter regeneration, the output signals 3a of a sensor 3 and the output signals 4a of a further sensor 4 are fed to a control unit 5. This evaluates the output signals of the sensors on the basis of a stored work program and stored data, recognizes the need to carry out particulate filter regeneration and provides control signals 5a that are required for carrying out the method according to the invention.

The stored data include, inter alia, an empirically determined threshold value for the particulate filter loading, which, if exceeded, causes the control unit 5 to recognize the need for particulate filter regeneration. The particulate filter loading of the particulate filter 2 is determined using the output signals of the sensors 3 and 4, which in the exemplary embodiment shown are NOx sensors. These NOx sensors are used for example to measure the NOx content of the exhaust gas fed to the particulate filter and the NOx content of the exhaust gas discharged from the particulate filter, and the need for particulate filter regeneration is recognized from the measured values by the control unit 5 using a difference calculation.

After the need for a particulate filter regeneration has been recognized and before this particulate filter regeneration is initiated, a first diagnosis value is determined. After this first diagnosis value has been determined, the particulate filter regeneration is carried out, in which the exhaust gas flowing through the particulate filter is brought to a high temperature, of for example 600° C., in order to burn off the pollutant particles deposited on the walls of the particulate filter.

After the particulate filter regeneration has been carried out, a second diagnosis value is determined. The difference between the two diagnosis values is then determined. The difference determined is then compared with a specified threshold value. This threshold value was empirically determined in advance and stored together with other data in a memory to which the control unit 5 has access. This threshold value is a specified constant value.

If the determined difference exceeds the specified threshold value, then it is recognized that there is a particulate filter defect. This particulate filter defect is a particulate filter defect that occurred during the particulate filter regeneration, in particular a crack in the housing of the particulate filter caused by an excessive temperature during the particulate filter regeneration. This particulate filter defect can be reliably identified and assigned to the particulate filter regeneration by means of the method described. Without carrying out the methods described herein, the cause of a great reduction in the efficiency of the particulate filter determined as part of an on-board diagnosis of the particulate filter could only be identified by a complex complete check of the entire exhaust system of the motor vehicle.

If the presence of a particulate filter defect that can be attributed to an excessive temperature during the particulate filter regeneration is detected on the basis of the determined difference, then the determined difference can be used for correcting the previously used particulate filter regeneration strategy. For example, the temperature used for subsequent particulate filter regeneration may be reduced. In some embodiments, the threshold value for the particulate filter loading, which when exceeded is used to recognize the need for particulate filter regeneration, may be reduced. Both of the aforementioned measures lead to the avoidance of an excessive temperature occurring in future particulate filter regenerations.

The aforementioned diagnosis values are also values that are determined using the output signals of the sensors 3 and 4. The diagnosis values are preferably gradient values. For example, a gradient value may be determined by evaluating the output signal of an NOx sensor arranged downstream of the particulate filter after the occurrence of a jump in an ammonia value measured upstream of the particulate filter.

It can be checked whether the difference in the diagnosis values, for example gradients of the NOx sensor output signal downstream of the particulate filter after an NH3 jump upstream of the particulate filter after the particulate filter regeneration and before the particulate filter regeneration, exceeds a specified threshold value, for example 20 ppm within 4 seconds, or whether this is not the case. If this is the case, then the presence of a filter crack is detected. This measure makes diagnosis of the particulate filter more robust and improves fault assignment.

What is claimed is:

1. A method for regenerating a coated particulate filter arranged in an exhaust-gas duct of a motor vehicle, the method comprising:
   detecting a need for particulate filter regeneration based on a comparison of two sensor readings including a first sensor arranged in the exhaust-gas duct upstream of the particulate filter and a second sensor arranged in the exhaust-gas tract downstream of the particulate filter;
   determining a first diagnosis value using the second sensor, wherein the second sensor includes an $NO_x$ sensor, before initiating particulate filter regeneration, wherein the first diagnosis value includes a first gradient value;
   after determining the first diagnosis value, carrying out particulate filter regeneration;
   determining a second diagnosis value using the second sensor after particulate filter regeneration, wherein the second diagnosis value includes a second gradient value;
   determining a difference between the first determined diagnosis value and the second determined diagnosis value;
   comparing the determined difference with a threshold value; and
   if the determined difference exceeds the threshold value, identifying a particulate filter defect and using the determined difference for correcting a particulate filter regeneration strategy for subsequent particulate filter regeneration, else not changing the particulate filter regeneration strategy based on an identified particulate filter defect; and
   wherein determining the gradient value for the respective diagnosis values includes evaluating an output signal of the second sensor after a jump occurs in an ammonia value measured upstream of the particulate filter.

2. The method as claimed in claim 1, wherein the threshold value comprises a specified constant value.

3. The method as claimed in claim 1, wherein the particulate filter defect occurred during regeneration.

4. The method as claimed in claim 3, wherein the particulate filter defect comprises a crack in the particulate filter.

5. The method as claimed in claim 1, wherein the corrected strategy includes lowering a temperature for the subsequent particulate filter regeneration.

6. The method as claimed in claim 1, wherein the corrected strategy includes lowering a threshold value for the particulate filter loading at which particulate filter regeneration is considered necessary.

7. The method as claimed in claim 1, wherein the method is performed by a control unit.

8. The method as claimed in claim 7, further comprising putting out control signals required for diagnosis on a basis of a stored work program and stored data.

9. A device for diagnosing a coated particulate filter arranged in an exhaust-gas duct of a motor vehicle, the device comprising a control unit programmed to:
   detect a need for particulate filter regeneration based on a comparison of two sensor readings including a first sensor arranged in the exhaust-gas duct upstream of the particulate filter and a second sensor arranged in the exhaust-gas tract downstream of the particulate filter;
   determine a first diagnosis value using the second sensor, the second sensor including an $NO_x$ sensor, before initiating particulate filter regeneration, the first diagnosis value including a gradient value;
   after determining the first diagnosis value, carrying out particulate filter regeneration;
   determine a second diagnosis value using the NOx sensor after particulate filter regeneration, the second diagnosis value including a gradient value;
   determine a difference between the first determined diagnosis value and the second determined diagnosis value;
   compare the determined difference with a threshold value; and
   if the determined difference exceeds the threshold value, identify a particulate filter defect and use the determined difference for correcting a particulate filter regeneration strategy for subsequent particulate filter regeneration, else not changing the particulate filter regeneration strategy based on an identified particulate filter defect; and
   wherein determining the gradient value for the respective diagnosis values includes evaluating an output signal of the second sensor after a jump occurs in an ammonia value measured upstream of the particulate filter.

* * * * *